United States Patent
Gutierrez et al.

(10) Patent No.: US 7,430,491 B2
(45) Date of Patent: Sep. 30, 2008

(54) TRACTOR-TRAILER HAVING SELF-CONTAINED APPARATUS ON-BOARD TRACTOR FOR ESTIMATING TRAILER WEIGHT

(75) Inventors: Francisco A. Gutierrez, Fort Wayne, IN (US); Bradley S. Carlson, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 11/248,058

(22) Filed: Oct. 11, 2005

(65) Prior Publication Data

US 2007/0083341 A1  Apr. 12, 2007

(51) Int. Cl.
- G06F 19/00 (2006.01)
- G01G 19/12 (2006.01)
- G01G 19/02 (2006.01)
- G01G 19/00 (2006.01)

(52) U.S. Cl. .......... 702/175; 177/1; 177/25.11; 177/25.12; 177/132; 177/136; 702/127; 702/173; 702/174

(58) Field of Classification Search .......... 177/1, 177/25.11, 25.12, 132, 136; 477/900; 702/127, 702/141, 142, 173, 174, 175
See application file for complete search history.

(56) References Cited

U.S. PATENT DOCUMENTS

| | | | |
|---|---|---|---|
| 3,283,838 A * | 11/1966 | Fetterman et al. ............ 177/1 |
| 3,324,287 A * | 6/1967 | Fetterman et al. ............ 702/41 |
| 4,490,802 A * | 12/1984 | Miller ............ 702/175 |
| 5,002,343 A | 3/1991 | Brearley et al. |
| 5,549,364 A | 8/1996 | Mayr-Fröhlich et al. |
| 5,610,372 A * | 3/1997 | Phillips et al. ............ 177/25.14 |
| 6,302,424 B1 | 10/2001 | Gisinger et al. |
| 6,314,383 B1 * | 11/2001 | Leimbach et al. ............ 702/173 |
| 7,363,116 B2 * | 4/2008 | Flechtner et al. ............ 701/1 |
| 2004/0181317 A1 * | 9/2004 | Flechtner et al. ............ 701/1 |

FOREIGN PATENT DOCUMENTS

| | | |
|---|---|---|
| DE | 19728867 A1 * | 1/1999 |
| EP | 0 082 663 A2 * | 6/1983 |
| EP | 1 382 948 A1 * | 1/2004 |
| JP | 2000-74727 A * | 3/2000 |

* cited by examiner

Primary Examiner—Edward R Cosimano
(74) Attorney, Agent, or Firm—Jeffrey P. Calfa; Gerald W. Askew

(57) ABSTRACT

A method and system for estimating weight of a trailer (10) being towed by a tractor (22) along a generally horizontal underlying surface. A portion of the trailer weight is borne on the tractor fifth wheel (26) and the remainder by rear wheels (18) rolling on the underlying surface. The tractor accelerates the trailer from an initial velocity to a final velocity over a time interval that is measured by a timer. The force that the tractor needed to exert on the trailer in order to change the velocity is also measured. Various data, including that force, are processed according to an algorithm to calculate the weight of the trailer by itself. Other data processed includes data ($N_0$) representing the portion of the weight of the trailer borne through the tractor, data representing the change in velocity of propulsion ($\Delta v$), data representing length of the interval of time (t), and data ($\mu_k$) representing coefficient of friction of the wheels (18) with the underlying surface.

21 Claims, 4 Drawing Sheets

70 $m \cdot v_{initial} + \int_0^t [\Sigma F] \cdot dt = m \cdot v_{final}$

72 $\int_0^t [\Sigma F] = m \cdot \Delta v \rightarrow \Delta v = v_{final} - v_{initial}$

74 $\Sigma F = T(t) - F_R$

76 $F_R = \mu_\kappa \cdot (m \cdot g - N_0) \rightarrow W_g = N_0 + N_1 + N_2 = m \cdot g$

78 $F_R \text{ is constant} \rightarrow \int_0^t F_R \cdot dt = F_R \cdot t$

80 $\int_0^t T(t) \cdot dt - \mu_\kappa \cdot t \cdot (m \cdot g - N_0) = m \cdot \Delta v$

82 $\int_0^t T(t) \cdot dt + \mu_\kappa \cdot t \cdot N_0 = m \cdot (\Delta v + \mu_\kappa \cdot t \cdot g)$

84 $m = \dfrac{\int_0^t T(t) \cdot dt + \mu_\kappa \cdot t \cdot N_0}{\Delta v + \mu_\kappa \cdot t \cdot g}$

FIG. 4

TRACTOR-TRAILER HAVING SELF-CONTAINED APPARATUS ON-BOARD TRACTOR FOR ESTIMATING TRAILER WEIGHT

FIELD OF THE INVENTION

This invention relates to self-propelled wheeled towing vehicles, such as highway tractors, that tow other wheeled vehicles, commonly referred to as trailers, through couplings, such a fifth wheel on the tractor and a kingpin on the trailer, that provide for some of a trailer's weight to be borne by the tractor. More specifically the invention relates to estimating, with reasonable accuracy, the weight of the trailer alone using apparatus that is on-board only the tractor.

BACKGROUND OF THE INVENTION

Tractor-trailers that transport cargo on roads and highways can have varying gross weights depending on various factors, especially the nature and amount of cargo. Knowledge of the gross weight of a tractor-trailer combination can be important for any of various reasons.

Gross weight of a tractor-trailer combination can of course be measured by driving the combination onto a suitable scale. However, such a scale is not necessarily always available when there is a need to measure weight. Moreover, such a measurement will not give the weight of the trailer alone unless the weight of the tractor is known, in which case tractor weight can simply be subtracted from the weight of the combination to yield the trailer weight.

The gross weight of a tractor typically changes only a relatively small amount depending in large part on the extent to which its fuel tanks are filled. That is typically not the case with a trailer where gross trailer weight is significantly greater when the trailer is fully loaded than when empty. Furthermore, weighing a trailer by itself can be inconvenient because of the constructional nature of the trailer where wheels at the rear bear only some of the weight while the remainder is borne either by the tractor when the trailer is connected to it or by a landing gear that is deployed to support the front of the trailer when disconnected from a tractor.

Known methods for on-board measurement of the weight of a tractor-trailer involve the use of sensors associated with the suspension system of each. Sensors associated with the tractor suspension system can furnish data for indicating the front and rear axle weights, which will include the effect of the portion of the trailer weight being borne by the tractor through the fifth wheel. Because at least one sensor is associated with the rear wheel suspension of the trailer, data from such a sensor or sensors must be electrically transmitted in one way or another from the trailer to the tractor in order for a complete estimate of tractor-trailer weight to be obtained.

SUMMARY OF THE INVENTION

The present invention relates to a novel weight estimating system and method for estimating with reasonable accuracy the weight of a trailer being towed by the tractor.

The invention enables the estimate of just the trailer weight to be obtained by a system that is self-contained on the tractor. Hence, electrical transmission between the tractor and the trailer is rendered unnecessary.

In the disclosed preferred embodiment, the invention is implemented as an algorithm that is executed by a processor on-board the tractor as the tractor-trailer is being accelerated. Two sensors on or near the fifth wheel which overlies rear wheels of the tractor provide data to the processor. One sensor measures force that the tractor exerts on the trailer along a line of propulsion as acceleration of the tractor also accelerates the trailer to change the propulsion velocity from an initial velocity to a final velocity. The other sensor measures the portion of the weight of the trailer borne by the tractor through the coupling of the trailer to the fifth wheel. Other data used by the algorithm include data representing the difference between the initial and final velocities, data representing the length of the interval of time for accomplishing the velocity change, and data representing coefficient of friction between rear wheels of the trailer and the underlying surface on which the tractor-trailer is accelerating.

In order to minimize the influence of aerodynamic drag on the trailer weight measurement, the velocity change occurs over a low speed range, such as from five miles per hour to ten miles per hour. During acceleration, the propulsion force is regularly measured as a function of time that is integrated over the time interval to provide a measurement of the force that the tractor needed to exert on the trailer along the line of propulsion during the time interval in order to change the velocity of propulsion from initial to final velocity.

The specific algorithm in the preferred embodiment comprises summing the force measurement with the product of a) the length of the time interval, b) the coefficient of friction of the interface between the rear trailer wheels and the underlying surface, and c) the portion of the weight of the trailer being borne by the tractor at the fifth wheel, and dividing that sum by the sum of the change in velocity and the product of d) the coefficient of friction of the interface, e) the length of the time interval, and f) the acceleration of gravity.

The result represents the mass of the trailer by itself, including any load carried by the trailer. Actual weight is obtained by multiplying the mass by the acceleration of gravity.

The algorithm also contemplates filtering of data, as appropriate, to attenuate the effects of irregularities in the underlying surface, i.e. bumps in the road, and noise in the propulsion force data.

Accordingly, one generic aspect of the invention relates to a method for estimating weight of a first vehicle during propulsion of the first vehicle along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface.

The method comprises changing velocity of propulsion of the second vehicle from an initial velocity to a final velocity over a time interval, measuring force that the second vehicle needed to exert on the first vehicle along a line of propulsion during the time interval in order to change the velocity of propulsion from initial to final velocity, and processing, according to a first-vehicle-weight-yielding algorithm, data that includes data representing force obtained from the measuring step, data representing the portion of the weight of the first vehicle borne through the second vehicle, data representing the change in velocity of propulsion, data representing length of the interval of time, and data representing coefficient of friction of the interface, to yield an estimate of weight of the first vehicle.

A further generic aspect of the invention relates to a combination of two vehicles comprising a first vehicle that is propelled along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface.

A first sensor provides data measuring force that the second vehicle exerts on the first vehicle along a line of propulsion during a time interval over which the velocity of propulsion changes from an initial velocity to a final velocity. A second sensor provides data measuring the portion of the weight of the first vehicle borne by the second vehicle.

A processor processes, according to a first-vehicle-weight-yielding algorithm, data that includes data from the first sensor, data from the second sensor, data representing the difference between the initial velocity and the final velocity, data representing length of the interval of time, and data representing coefficient of friction of the interface, to yield an estimate of weight of the first vehicle.

A still further generic aspect of the invention relates to a system for estimating weight of a first vehicle that is being propelled along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface.

The system comprises a first sensor providing data for calculating force that the second vehicle needed to exert on the first vehicle along a line of propulsion during a time interval over which the velocity of propulsion changed from an initial velocity to a final velocity.

The system also comprises a second sensor for measuring the portion of the weight of the first vehicle borne through the second vehicle, and a processor for processing, according to a first-vehicle-weight-yielding algorithm, the force data that was calculated using data from the first sensor, data from the second sensor, data representing the difference between the initial velocity and the final velocity, data representing length of the interval of time, and data representing coefficient of friction of the interface, to yield an estimate of weight of the first vehicle.

The invention also relates to a processor comprising an algorithm for estimating weight of a first vehicle that is being propelled along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface, wherein execution of the algorithm comprises the processor processing data that includes data representing force that the second vehicle needed to exert on the first vehicle along a line of propulsion during a time interval over which the velocity of propulsion changed from an initial velocity to a final velocity, data representing the portion of the weight of the first vehicle borne through the second vehicle, data representing the difference between the initial velocity and the final velocity, data representing length of the interval of time, and data representing coefficient of friction of the interface.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 4 is a diagram of mathematical relationships relating FIGS. 1, 2, and 3.

DESCRIPTION OF THE PREFERRED EMBODIMENT

Figure 1:
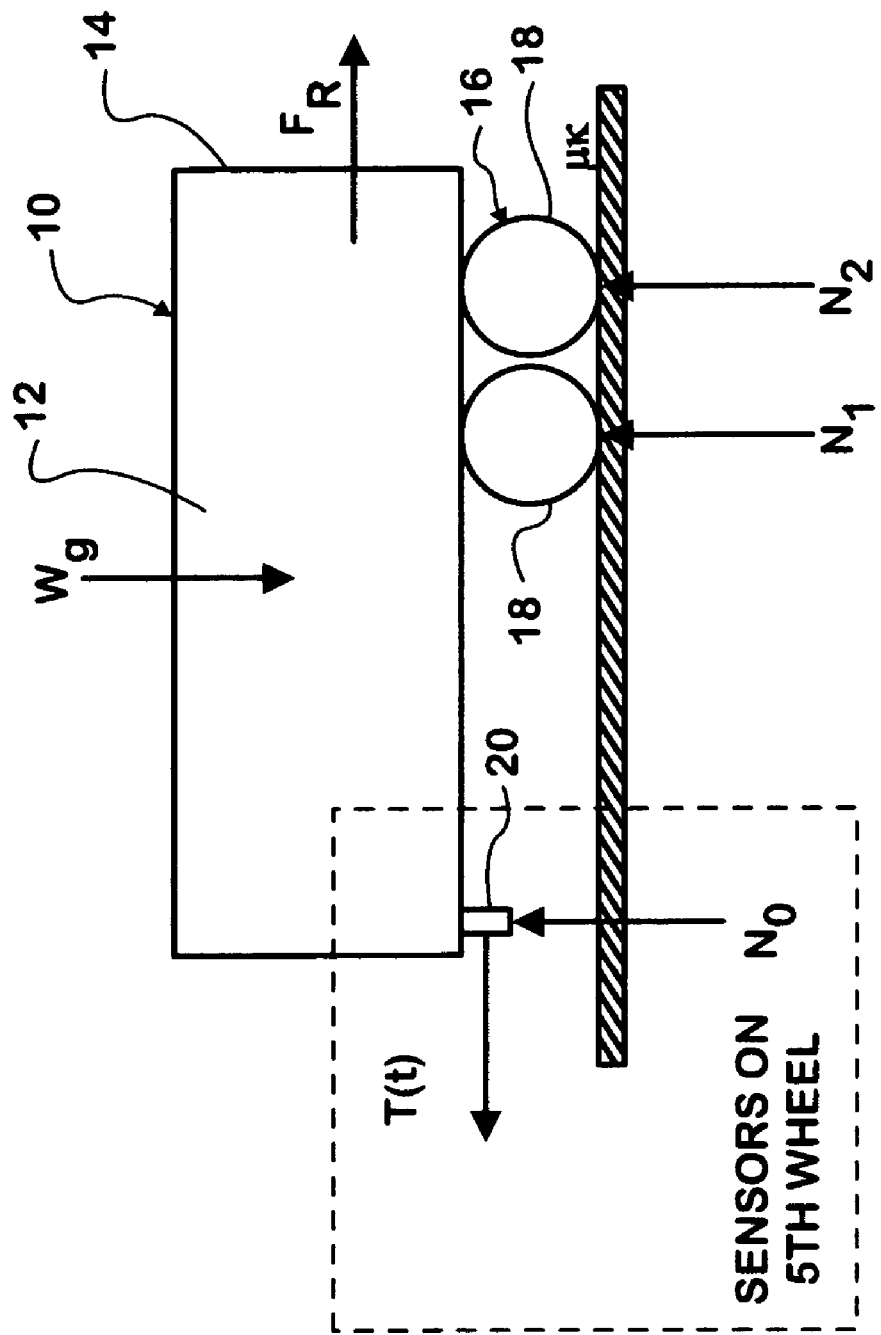
FIG. 1 is a free body diagram showing forces relevant to principles of the invention acting on a trailer shown in left side elevation view.

FIG. 1 shows a trailer 10 that comprises a body 12 having an interior for holding cargo that is loaded onto and unloaded from the trailer when doors 14 at the rear of body 12 are open. Trailer 10 also has an undercarriage that includes a rear wheel bogie 16 having two pairs of wheels 18 in tandem proximate the rear and a kingpin 20 proximate the front.

Figure 2:
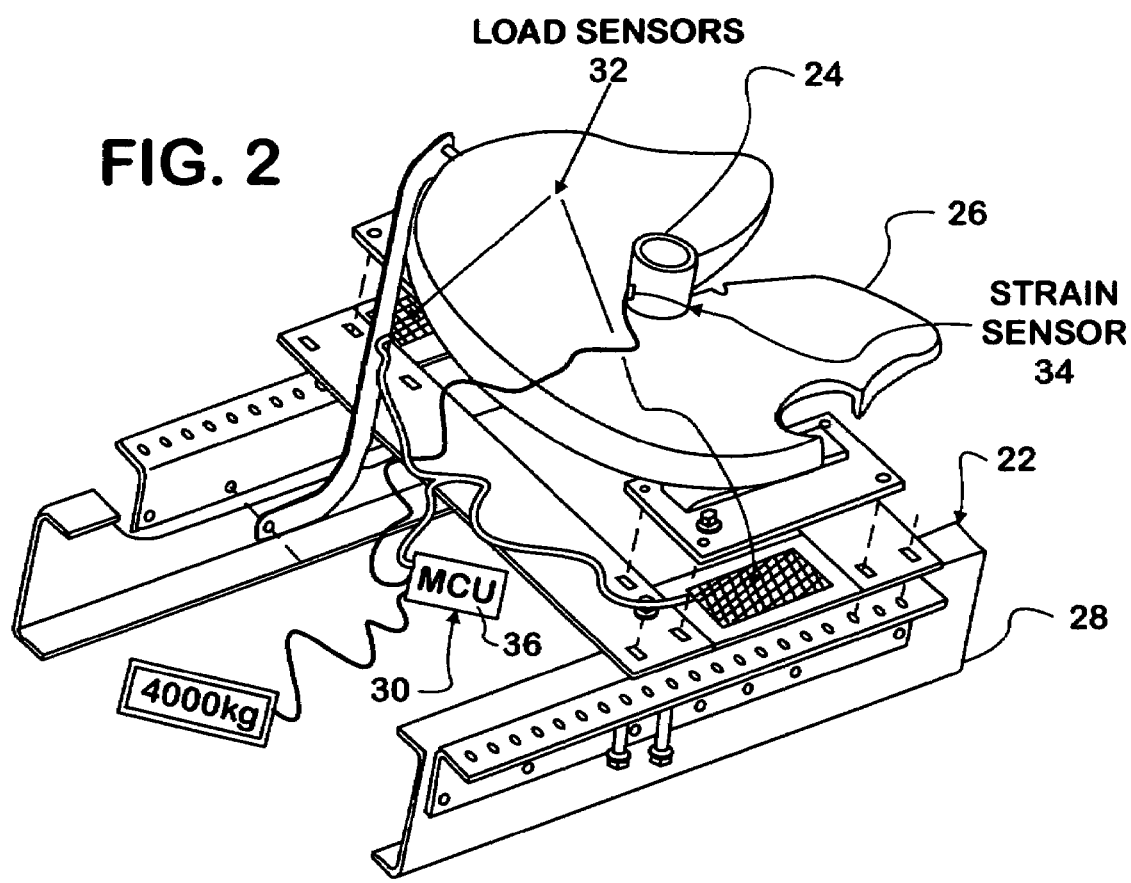
FIG. 2 is a perspective view, partly exploded, showing a portion of a tractor relevant to principles of the invention.

When trailer 10 is coupled to a tractor 22, shown in FIG. 2, kingpin 20 is received at the center 24 of a fifth wheel 26 that provides underlying support for the front end of the trailer while providing for articulation of the trailer on the tractor about the common generally vertical axis of center 24 and kingpin 20.

Although not shown in FIG. 2, tractor 22 comprises at least one axle—two are more typical—having one or more wheels at the axle ends. The axles are suspended from the tractor's frame 28 by a suspension system that is also not shown. With the trailer coupled to the tractor via kingpin 20 and fifth wheel 26, the portion of the trailer weight exerted on the fifth wheel is transmitted through the frame, suspension, and axles to the underlying surface on which the tractor travels.

An electronic weight measuring system 30 is self-contained on tractor 22. System 30 comprises a load sensor 32 and a strain sensor 34. System 30 also utilizes certain existing portions of the electrical system of the tractor, such as a processor, MCU 36.

Load sensor 32 comprises two sensing elements disposed to either side of the fifth wheel where the latter attaches to rails of frame 28. Each element provides a signal indicating the vertical force that is being applied by the fifth wheel to the frame. That force is transmitted through the frame, suspension, and axles to the underlying surface. The two elements forming sensor 32 electrically signal the total force being applied by the fifth wheel to the underlying surface.

Strain sensor 34 is arranged to measure strain in fifth wheel 26 at center 24 along the fore-aft centerline of the tractor. When tractor 22 is towing trailer 10 in a straight line and the tractor accelerates, a force is exerted along that line between the fifth wheel and kingpin 20 to accelerate the trailer in unison with the tractor. This creates measurable strain that results in a corresponding electrical signal from sensor 34 to MCU 30.

In accordance with certain principles of the invention, MCU 30 utilizes not only the information provided by sensors 32, 34, but also information from the tractor electrical system. The latter information comprises speed data representing the speed at which tractor 22 is traveling, typically available on a data link linking various on-board devices. Certain other data is entered into memory of MCU 30 for use by system 30, including a data value for the acceleration of gravity (parameter g) and a data value for the coefficient of friction at the interface between the tires of trailer wheels 18 and the underlying surface on which the trailer is being towed by the tractor (parameter $\mu_k$).

For understanding the genesis of the present invention, the reader is referred to the free body diagram of FIG. 1. that shows various forces as vectors $W_g$, $N_0$, $N_1$, $N_2$, $F_R$, and T(t).

Vector $W_g$ represents the total weight of trailer 10 including any cargo that may be inside body 12. In side elevation view there are three locations where that weight is supported. Two are where each of the tandem rear wheels contact the underlying surface, and the third is where the front end of the trailer is supported by the tractor fifth wheel. Consequently, $W_g$ equals the sum of $N_0$, $N_1$, and $N_2$, as shown by a portion of line 76 in FIG. 4. The trailer weight $W_9$ and mass (parameter m) are related by parameter g, and so $W_g$ also equals the product m·g, as shown on line 76 in FIG. 4.

It is the inventors' recognition of an interrelationship between these vertical forces and horizontal acceleration force acting on trailer 10 when tractor 22 accelerates that is one premise for the invention.

Another premise is the recognition that a change in momentum of a moving tractor-trailer correlates with the horizontal acceleration force that caused the momentum change. This relationship is shown at line 70 in FIG. 4.

Initial momentum before acceleration is $m·v_{final}$, momentum after acceleration is $m·v_{final}$. The difference between initial and final momentum is given by the integral of acceleration force during the time interval during which velocity changed from the initial velocity $v_{initial}$ to the final velocity $v_{final}$. Line 72 shows a rearrangement of the relationship given at line 70.

At any given speed, the trailer itself has a certain inertia. In the absence of any resistance to its motion, the trailer inertia will remain unchanged. Excluding aerodynamic resistance and frictional resistance in the journaling of wheels 18 on the trailer, and assuming that the surface on which the tractor-trailer is traveling is perfectly smooth and horizontal, there is still a frictional resistance between the pneumatic tires on the wheels and the underlying surface. That frictional resistance creates a resistance force FR that can be reasonably approximated by the product of the coefficient of friction $\mu_k$ and the portion of the trailer weight borne by wheels 18. The portion of the trailer weight that is borne by the rear wheels 16 is the difference between the total trailer weight m·g and the portion borne by the fifth wheel. That difference is represented by (m·g —$N_0$).

Using relationships that have now been explained, the change in momentum m·Δv resulting from acceleration from the initial velocity to the final velocity can be expressed in terms presented on the left side of the equation shown at line 80 in FIG. 4. The propulsion force applied by the tractor to accelerate the trailer during the time t is represented by T(t). The integral of T(t) over that time interval less the resistance force (assumed constant) over that interval will equal the change in momentum at line 74 in FIG. 4.

In order to increase speed by application of an external force, the force must be sufficiently large to overcome the resistance force $F_R$. Line 76 of FIG. 4 shows that $F_R$ equals the product of $\mu_k$ and the portion of the trailer weight borne by wheels 18. Continued acceleration requires that resistance force $F_R$ be continually overcome. If acceleration occurs during a time interval t, and if it is assumed that $F_R$ remains constant, then the relationship shown at line 78 in FIG. 4 is valid.

Using relationships that have now been explained, the change in momentum m·Δv resulting from acceleration from the initial velocity to the final velocity can be expressed in terms presented on the left side of the equation shown at line 80 in FIG. 4. The propulsion force applied by the tractor to accelerate the trailer during the time t is represented by T(t). The integral of T(t) over that time interval less the resistance force (assumed constant) over that interval will equal the change in momentum at line 74 in FIG. 4.

Rearrangement of terms in the equation at line 80 of FIG. 4 yields the equation at line 82. Solving the latter equation for m yields the equation at line 84. It is the equation at line 84 that is implemented in an algorithm in processor MCU 36 to estimate mass of the trailer by itself. Because mass and weight are related by the acceleration of gravity g, multiplication of the mass calculated using the equation at line 84 by g yields an estimate of trailer weight.

Figure 3:
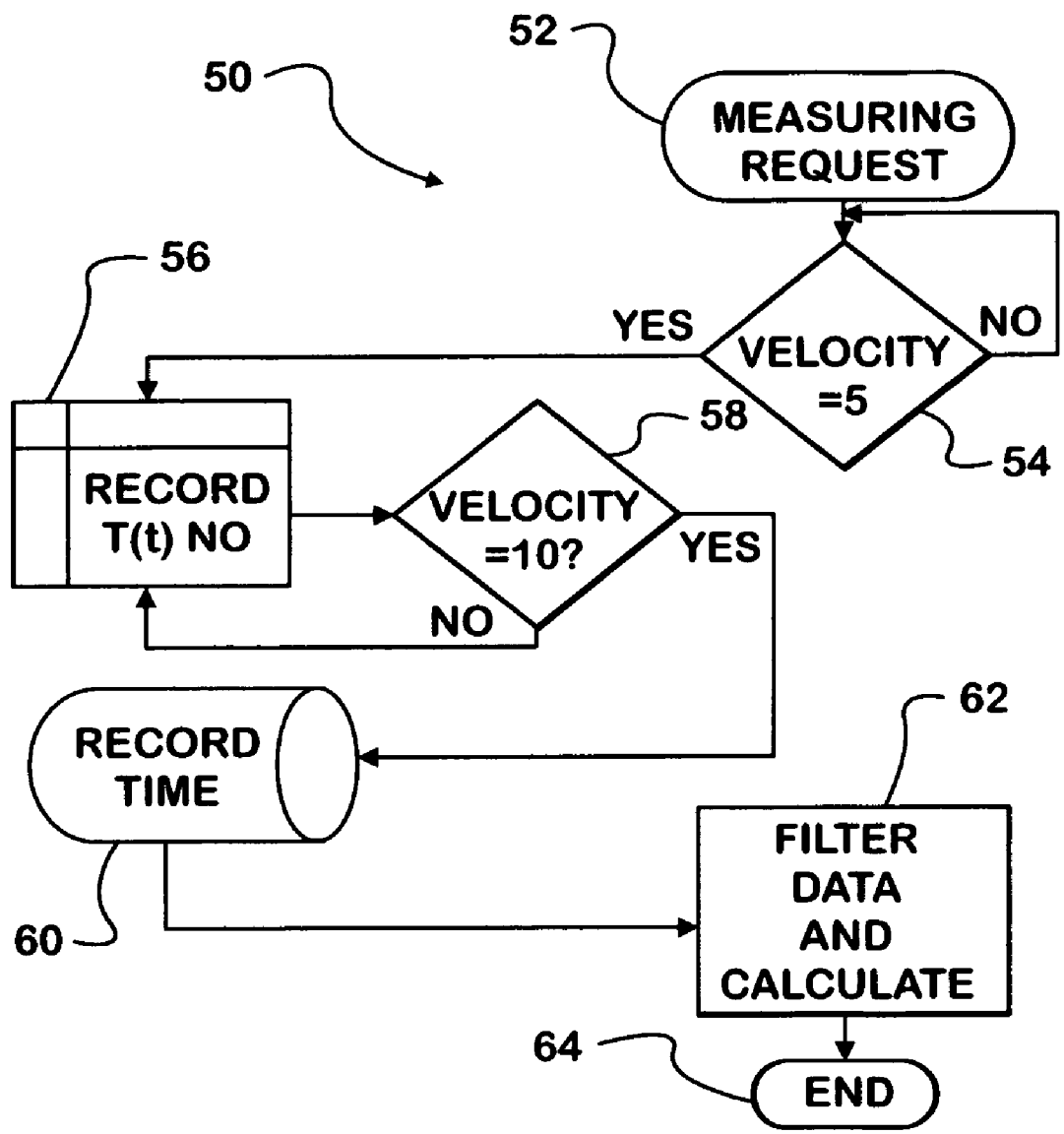
FIG. 3 is a flow diagram illustrating steps in a method according to principles of the invention.

MCU 36 processes data in accordance with the flow diagram 50 of FIG. 3 representing execution of the algorithm that implements the equation at line 84 of FIG. 4. The algorithm is called up by a weight measurement request 52 that can be initiated by the driver of the tractor.

As mentioned earlier, the invention contemplates that the tractor-trailer is in motion, but moving at a relatively low speed like five miles per hour before the measurement begins. That eliminates the effect of static friction that could impact the measurement if the measurement were to commence while the tractor-trailer was standing still before any acceleration. A step 54 monitors vehicle speed and causes the algorithm to commence executing as vehicle speed passes through five miles per hour during acceleration. During acceleration, the measured propulsion force T(t) is measured as a function of time, shown by step 56, with the signal from strain sensor 34 being converted to a corresponding data value for T(t).

The data value for $N_0$ is derived from the signal from sensor 32. If the surface along which the tractor-trailer is traveling is smooth, the data value for $N_0$ should not change, and it therefore may be measured at any time, even before the trailer weight measurement calculation performed by MCU 36 begins. If the surface is not smooth, $N_0$ may vary to some extent as the vehicle is traveling along the surface, and so some error may be introduced into the accuracy of the weight measurement depending on when the data value for $N_0$ is actually measured. On a relatively smooth road surface, such error will be relatively small.

The accumulation of data continues until a step 58 detects that vehicle speed has reached 10 miles per hour.

When step 54 detected that the vehicle speed had reached five miles per hour, an internal timer was started in MCU 36 (reference numeral 60). When step 58 detects that vehicle speed has reached 10 miles per hour, the timer stops. The measured time is the length of the time interval needed to accelerate the tractor-trailer from the smaller initial speed to the larger final speed, and it provides the data value for t in the algorithm.

A data value for the coefficient of friction $\mu_k$ can be stored in memory in MCU 36. Data values for $\mu_k$ may vary to some extent depending on the particular road surface. A value appropriate to a particular road surface may be selected from available information—The Society of Automotive Engineers is one source—and used in the processing. Multiple values may be stored in memory and selected as appropriate.

To account for effects such as noise and vibration, the data accumulated during step 56 can be filtered as part of the step 62 that performs the calculation of trailer mass using the equation at line 84 of FIG. 4. The algorithm then concludes at an end 64. When measuring data that may be corrupted by random variations, the standard deviation can be estimated to characterize noise, showing how the noise in distributed. With that information, known filters can be designed and used to filter out random noise.

The foregoing description has disclosed a method for estimating weight of a first vehicle (the trailer) during its propulsion along a generally horizontal underlying surface by and in unison with a second vehicle (the tractor). A portion of the weight of the trailer is borne on the underlying surface at a location spaced horizontally from an interface between pneumatic tires on wheels 18 and the underlying surface. It is through that interface that the remainder of the weight of the trailer is supported on the underlying surface.

The method involves changing velocity of propulsion of the tractor from an initial velocity to a final velocity over a time interval that is measured by a timer. The force that the tractor needed to exert on the trailer along a line of propulsion in order to change the velocity of propulsion from initial to final velocity is also measured. That force is preferably obtained by integration over the time interval. Various data, including that force, are processed according to a trailer-vehicle-weight-yielding algorithm to calculate the weight of the trailer by itself.

Besides data representing the propulsion force that produced the velocity change, other data processed includes data ($N_0$) representing the portion of the weight of the trailer borne through the tractor, data representing the change in velocity of propulsion ($\Delta v$), data representing length of the interval of time (t), and data ($\mu_k$) representing coefficient of friction of the interface. When the result is in units of mass, weight is obtained by multiplying the mass by the acceleration of gravity.

While a presently preferred embodiment of the invention has been illustrated and described, it should be appreciated that principles of the invention apply to all embodiments falling within the scope of the following claims.

What is claimed is:

1. A method for estimating weight of a first vehicle during propulsion of the first vehicle along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface, the method comprising:

changing velocity of propulsion of the second vehicle from an initial velocity to a final velocity over a time interval;

measuring force that the second vehicle needed to exert on the first vehicle along a line of propulsion during the time interval in order to change the velocity of propulsion from initial to final velocity;

and processing, according to a first-vehicle-weight-yielding algorithm, data that includes data representing force obtained from the measuring step, data representing the portion of the weight of the first vehicle borne through the second vehicle, data representing the change in velocity of propulsion, data representing length of the interval of time, and data representing coefficient of friction of the interface, to yield an estimate of weight of the first vehicle.

2. A method as set forth in claim 1 wherein the algorithm processes the initial velocity as a non-zero velocity.

3. A method as set forth in claim 1 wherein the algorithm processes the coefficient of friction as the coefficient of friction between pneumatic tires on the first vehicle and the underlying surface.

4. A method as set forth in claim 1 data including obtaining data corresponding to the portion of the weight of the first vehicle borne through the second vehicle from a first sensor, and obtaining data representing the force measurement from a second sensor.

5. A method as set forth in claim 1 including obtaining data corresponding to the portion of the weight of the first vehicle borne through the second vehicle from a first sensor disposed on the second vehicle, obtaining data representing the force measurement from a second sensor disposed on the second vehicle, and processing data according to the first-vehicle-weight-yielding algorithm in a processor on board the second vehicle.

6. A method as set forth in claim 1 wherein the step of changing velocity of propulsion of the second vehicle from an initial velocity to a final velocity over a time interval comprises increasing the velocity of propulsion from an initial smaller velocity to a final larger velocity.

7. A method as set forth in claim 1 wherein force that the second vehicle exerted on the first vehicle during the time interval is measured by measuring force as a function of time that is integrated over the length of the time interval.

8. A method as set forth in claim 7 wherein the algorithm comprises summing the force measurement with the product of a) the length of the time interval, b) the coefficient of friction of the interface, and c) the portion of the weight of the first vehicle borne through the second vehicle, and dividing that sum by the sum of the change in velocity and the product of d) the coefficient of friction of the interface, e) the length of the time interval, and f) the acceleration of gravity.

9. A method as set forth in claim 8 further comprising multiplying the quotient resulting from the dividing step by theacceleration of gravity.

10. A combination of two vehicles comprising:

a first vehicle that is propelled along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface;

a first sensor for providing data measuring force that the second vehicle exerts on the first vehicle along a line of propulsion during a time interval over which the velocity of propulsion changes from an initial velocity to a final velocity;

a second sensor for providing data measuring the portion of the weight of the first vehicle borne through the second vehicle;

and a processor for processing, according to a first-vehicle-weight-yielding algorithm, data that includes data from the first sensor, data from the second sensor, data representing the difference between the initial velocity and the final velocity, data representing length of the interval of time, and data representing coefficient of friction of the interface, to .yield an estimate of weight of the first vehicle.

11. A combination as set forth in claim 10 wherein execution of the algorithm by the processor causes force data from the first sensor to be integrated during the time interval to provide at the end of the time interval a measurement of force that changed the velocity of propulsion from initial to final velocity.

12. A combination as set forth in claim 10 wherein execution of the algorithm by the processor further causes the force measurement to be summed with the product of a) the length of the time interval, b) the coefficient of friction of the interface, and c) the portion of the weight of the first vehicle borne through the second vehicle, and that sum to be divided by the sum of the change in velocity and the product of d) the coefficient of friction of the interface, e) the length of the time interval, and f) the acceleration of gravity.

13. A combination as set forth in claim 12 wherein execution of the algorithm by the processor further causes the quotient resulting from the division to be multiplied by the acceleration of gravity.

14. A combination as set forth in claim 10 wherein the first sensor, the second sensor, and the processor are disposed on the second vehicle.

15. A combination as set forth in claim 14 wherein the first sensor and the second sensor are disposed in association with a fifth wheel that is disposed on the second vehicle and that provides both operative coupling with the first vehicle and underlying support for some of the weight of the first vehicle, and wherein the first vehicle comprises wheels supporting the remainder of the weight of the first vehicle on the underlying surface via the interface.

16. A combination as set forth in claim 15 wherein the wheels of the first vehicle comprise pneumatic tires that are in rolling contact with the underlying surface at the interface.

17. A system for estimating weight of a first vehicle that is being propelled along a generally horizontal underlying surface by and in unison with a second vehicle through which a portion of the weight of the first vehicle is borne on the underlying surface at a location spaced horizontally from an interface between the first vehicle and the underlying surface through which interface the remainder of the weight of the first vehicle is supported on the underlying surface, the system comprising:

a first sensor for measuring force that the second vehicle needed to exert on the first vehicle along a line of propulsion during a time interval over which the velocity of propulsion changed from an initial velocity to a final velocity;

a second sensor for measuring the portion of the weight of the first vehicle borne through the second vehicle;

and a processor for processing, according to a first-vehicle-weight-yielding algorithm, data that includes data from the first sensor, data from the second sensor, data representing the difference between the initial velocity and the final velocity, data representing length of the interval of time, and data representing coefficient of friction of the interface, to yield an estimate of weight of the first vehicle.

18. A system as set forth in claim 17 wherein the algorithm processes the initial velocity as a nonzero velocity and the final velocity as a nonzero velocity that is greater than the initial velocity.

19. A system as set forth in claim 17 wherein force that the second vehicle needed to exert on the first vehicle during the time interval is measured by measuring force as a function of time that is integrated over the length of the time interval.

20. A system as set forth in claim 19 wherein the algorithm comprises summing the force measurement with the product of a) the length of the time interval, b) the coefficient of friction of the interface, and c) the portion of the weight of the first vehicle borne through the second vehicle, and dividing that sum by the sum of the change in velocity and the product of d) the coefficient of friction of the interface, e) the length of the time interval, and f) the acceleration of gravity.

21. A system as set forth in claim 20 further comprising multiplying the quotient resulting from the dividing step by the acceleration of gravity.

* * * * *